(12) United States Patent
Yamaai

(10) Patent No.: US 8,564,846 B2
(45) Date of Patent: Oct. 22, 2013

(54) FORM PROCESSING APPARATUS, FORM PROCESSING METHOD, AND STORAGE MEDIUM FOR UPDATING DEFINITION DATA

(75) Inventor: Toshifumi Yamaai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 13/222,288

(22) Filed: Aug. 31, 2011

(65) Prior Publication Data

US 2012/0062961 A1 Mar. 15, 2012

(30) Foreign Application Priority Data

Sep. 13, 2010 (JP) ................................. 2010-204858

(51) Int. Cl.
*H04N 1/40* (2006.01)
(52) U.S. Cl.
USPC ....................................................... 358/448
(58) Field of Classification Search
None
See application file for complete search history.

(56) References Cited

U.S. PATENT DOCUMENTS

| 4,933,984 | A | * | 6/1990 | Nakano et al. | ................. | 382/175 |
| 4,949,392 | A | * | 8/1990 | Barski et al. | ................... | 382/283 |
| 2008/0285792 | A1 | * | 11/2008 | Comay | ......................... | 382/100 |
| 2010/0125617 | A1 | * | 5/2010 | Alexander | .................... | 707/809 |

FOREIGN PATENT DOCUMENTS

| JP | 2000-029986 | 1/2000 |
| JP | 2000-268106 | 9/2000 |
| JP | 2001-126010 | 5/2001 |
| JP | 2002-298081 | 10/2002 |
| JP | 2005-044256 | 2/2005 |
| JP | 4136357 | 8/2008 |
| JP | 4183527 | 11/2008 |

* cited by examiner

*Primary Examiner* — Jeremiah Bryar
(74) *Attorney, Agent, or Firm* — IPUSA, PLLC

(57) ABSTRACT

A form processing apparatus includes a storing unit configured to store definition data for scanning and processing a first form in a storage area, an image input unit configured to scan a second form to obtain a form image, a position adjusting unit configured to adjust a position of a process region representing an entry field of a process item on the form image based on a relative position of the entry field of the corresponding process item on the first form and to associate the process region on the form image with definition information of the process item defined in the definition data, and an updating unit configured to update the definition information by changing a value indicating the position of the process region in the definition information to a value indicating the adjusted position of the process region.

8 Claims, 18 Drawing Sheets

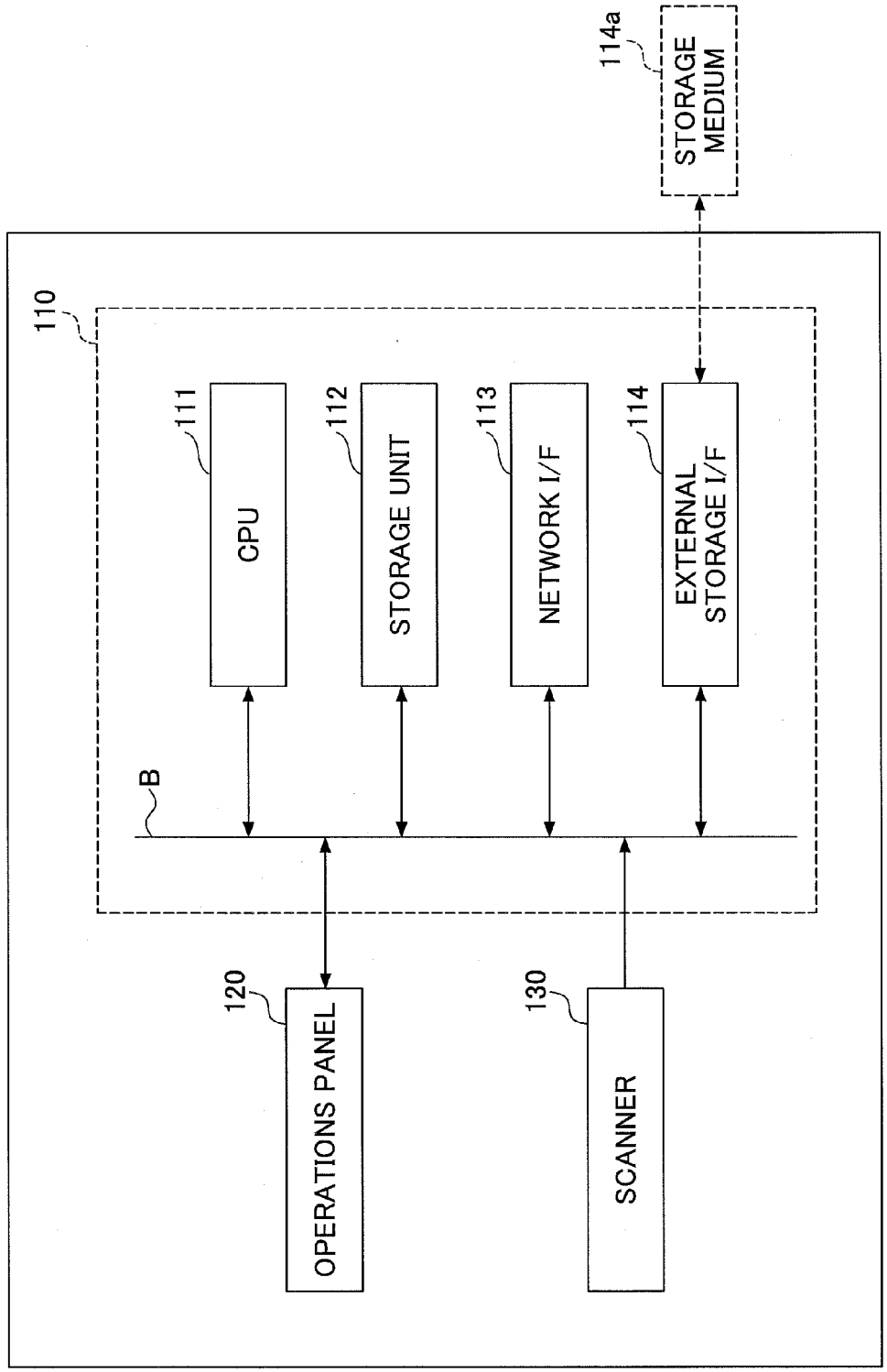

FIG.2A

XY LEASE

LEASE AGREEMENT

PROPERTY NAME

PAYMENT

LESSEE

GUAR-ANTOR

LEASE AGREEMENT

LESSEE

GUAR-
ANTOR

XY LEASE

PROPERTY NAME | MAKER | PAYMENT

12

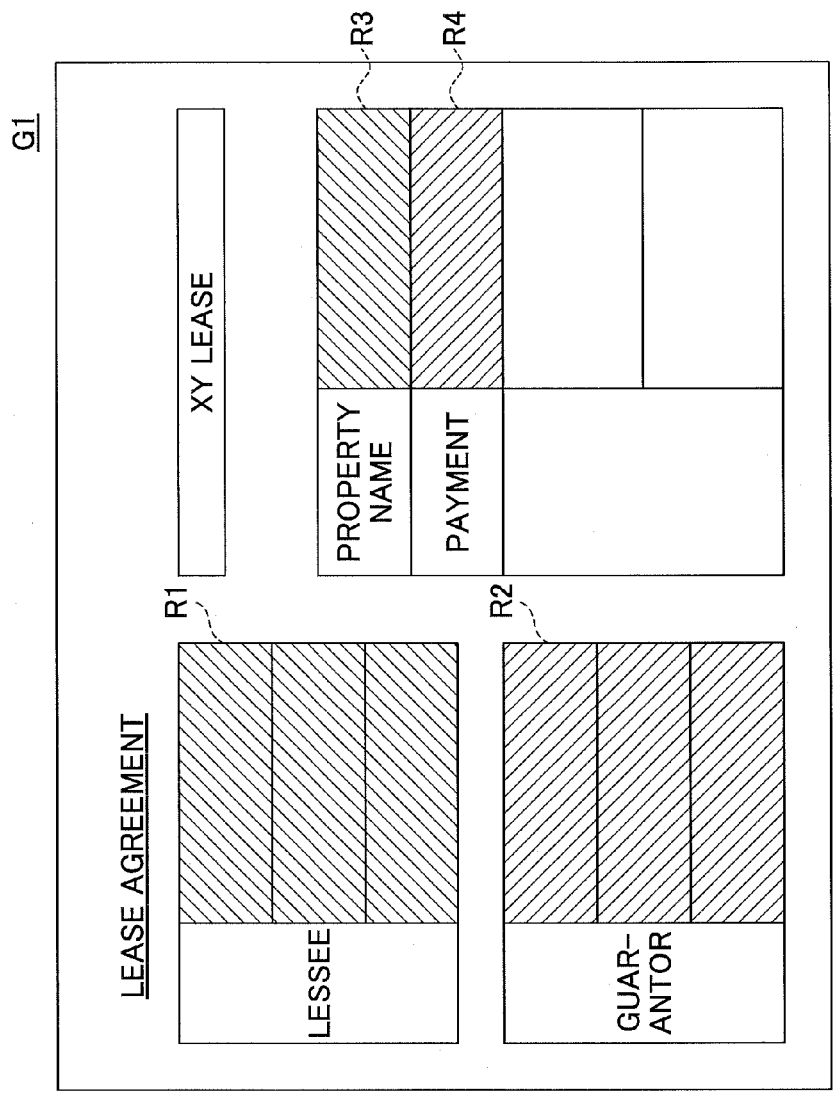

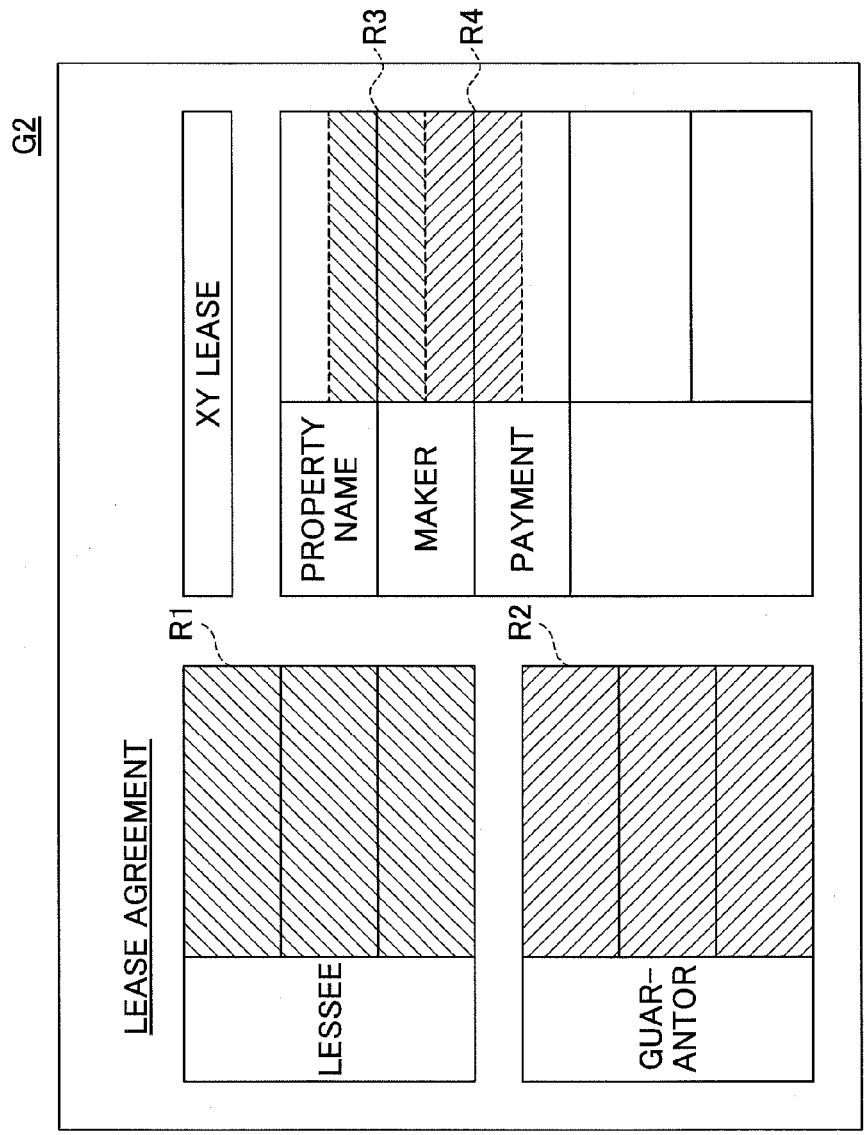

LESSEE
ITEM NAME: LESSEE
RELATIVE POSITION: RIGHT, 3 ROWS, 1 COLUMN  }~-D1
POSITION OF PROCESS REGION: (64,73)-(185,151)
PROCESS INFORMATION: PARTIAL IMAGE STORING PROCESS

GUARANTOR
ITEM NAME: GUARANTOR
RELATIVE POSITION: RIGHT, 3 ROWS, 1 COLUMN  }~-D2
POSITION OF PROCESS REGION: (64,154)-(185,232)
PROCESS INFORMATION: MOSAIC PROCESS

PROPERTY NAME
ITEM NAME: PROPERTY NAME
RELATIVE POSITION: RIGHT, 1 ROW, 1 COLUMN  }~-D3
POSITION OF PROCESS REGION: (275,72)-(356,95)
PROCESS INFORMATION: OCR PROCESS
CHARACTER TYPE: KANJI, ALPHABET, NUMERAL, HIRAGANA, KATAKANA
KNOWLEDGE PROCESSING: PROPERTY NAME

PAYMENT
ITEM NAME: PAYMENT
RELATIVE POSITION: RIGHT, 1 ROW, 1 COLUMN  }~-D4
POSITION OF PROCESS REGION: (275,99)-(356,122)
PROCESS INFORMATION: OCR PROCESS
CHARACTER TYPE: NUMERAL, SYMBOL

```
#LESSEE
ITEM NAME: LESSEE
RELATIVE POSITION: RIGHT, 3 ROWS, 1 COLUMN
POSITION OF PROCESS REGION: (64,73)-(185,151)
PROCESS INFORMATION: PARTIAL IMAGE STORING PROCESS

GUARANTOR
ITEM NAME: GUARANTOR
RELATIVE POSITION: RIGHT, 3 ROWS, 1 COLUMN
POSITION OF PROCESS REGION: (64,154)-(185,232)
PROCESS INFORMATION: MOSAIC PROCESS

PROPERTY NAME
ITEM NAME: PROPERTY NAME
RELATIVE POSITION: RIGHT, 1 ROW, 1 COLUMN
POSITION OF PROCESS REGION: (275,72)-(356,95)          ~D5
PROCESS INFORMATION: OCR PROCESS
CHARACTER TYPE: KANJI, ALPHABET, NUMERAL, HIRAGANA, KATAKANA
KNOWLEDGE PROCESSING: PROPERTY NAME

PAYMENT
ITEM NAME: PAYMENT
RELATIVE POSITION: RIGHT, 1 ROW, 1 COLUMN
POSITION OF PROCESS REGION: (275,99)-(356,122)         ~D6
PROCESS INFORMATION: OCR PROCESS
CHARACTER TYPE: NUMERAL, SYMBOL
```

```
#LESSEE
ITEM NAME: LESSEE
RELATIVE POSITION: RIGHT, 3 ROWS, 1 COLUMN
POSITION OF PROCESS REGION: (64,73)-(185,151)
PROCESS INFORMATION: PARTIAL IMAGE STORING PROCESS

GUARANTOR
ITEM NAME: GUARANTOR
RELATIVE POSITION: RIGHT, 3 ROWS, 1 COLUMN
POSITION OF PROCESS REGION: (64,154)-(185,232)
PROCESS INFORMATION: MOSAIC PROCESS

PROPERTY NAME
ITEM NAME: PROPERTY NAME
RELATIVE POSITION: RIGHT, 1 ROW, 1 COLUMN
POSITION OF PROCESS REGION: (275,63)-(356,85)          ~D5
PROCESS INFORMATION: OCR PROCESS
CHARACTER TYPE: KANJI, ALPHABET, NUMERAL, HIRAGANA, KATAKANA
KNOWLEDGE PROCESSING: PROPERTY NAME

PAYMENT
ITEM NAME: PAYMENT
RELATIVE POSITION: RIGHT, 1 ROW, 1 COLUMN
POSITION OF PROCESS REGION: (275,107)-(356,129)        ~D6
PROCESS INFORMATION: OCR PROCESS
CHARACTER TYPE: NUMERAL, SYMBOL
```

FIG.7

■ CONFIGURATION SCREEN                                                                W2

REGION INFORMATION

| | CHARACTER TYPE | OCR RECOGNITION | OMR RECOGNITION |

REGION TYPE: FOR FORM RECOGNITION ▶

RECOGNITION MODE: RECOGNITION OF JAPANESE CHARACTERS ▶

REGION COORDINATES:
- XS: 275   YS: 85
- XE: 356   YE: 107

ADDITIONAL INFORMATION

ITEM NAME: MAKER

RELATIVE POSITION: RIGHT ▶

SINGLE ENTRY FIELD: ●

PLURAL ENTRY FIELDS: — ▶

LESSEE
ITEM NAME: LESSEE
RELATIVE POSITION: RIGHT, 3 ROWS, 1 COLUMN
POSITION OF PROCESS REGION: (64,73)-(185,151)
PROCESS INFORMATION: PARTIAL IMAGE STORING PROCESS

GUARANTOR
ITEM NAME: GUARANTOR
RELATIVE POSITION: RIGHT, 3 ROWS, 1 COLUMN
POSITION OF PROCESS REGION: (64,154)-(185,232)
PROCESS INFORMATION: MOSAIC PROCESS

PROPERTY NAME
ITEM NAME: PROPERTY NAME
RELATIVE POSITION: RIGHT, 1 ROW, 1 COLUMN
POSITION OF PROCESS REGION: (275,63)-(356,85)
PROCESS INFORMATION: OCR PROCESS
CHARACTER TYPE: KANJI, ALPHABET, NUMERAL, HIRAGANA, KATAKANA
KNOWLEDGE PROCESSING: PROPERTY NAME

D7

MAKER
ITEM NAME: MAKER
RELATIVE POSITION: RIGHT, 1 ROW, 1 COLUMN
POSITION OF PROCESS REGION: (275,85)-(356,107)
PROCESS INFORMATION: OCR PROCESS
CHARACTER TYPE: KANJI, ALPHABET, NUMERAL, HIRAGANA, KATAKANA
KNOWLEDGE PROCESSING: MAKER NAME

PAYMENT
ITEM NAME: PAYMENT
RELATIVE POSITION: RIGHT, 1 ROW, 1 COLUMN
POSITION OF PROCESS REGION: (275,107)-(356,129)
PROCESS INFORMATION: OCR PROCESS
CHARACTER TYPE: NUMERAL, SYMBOL

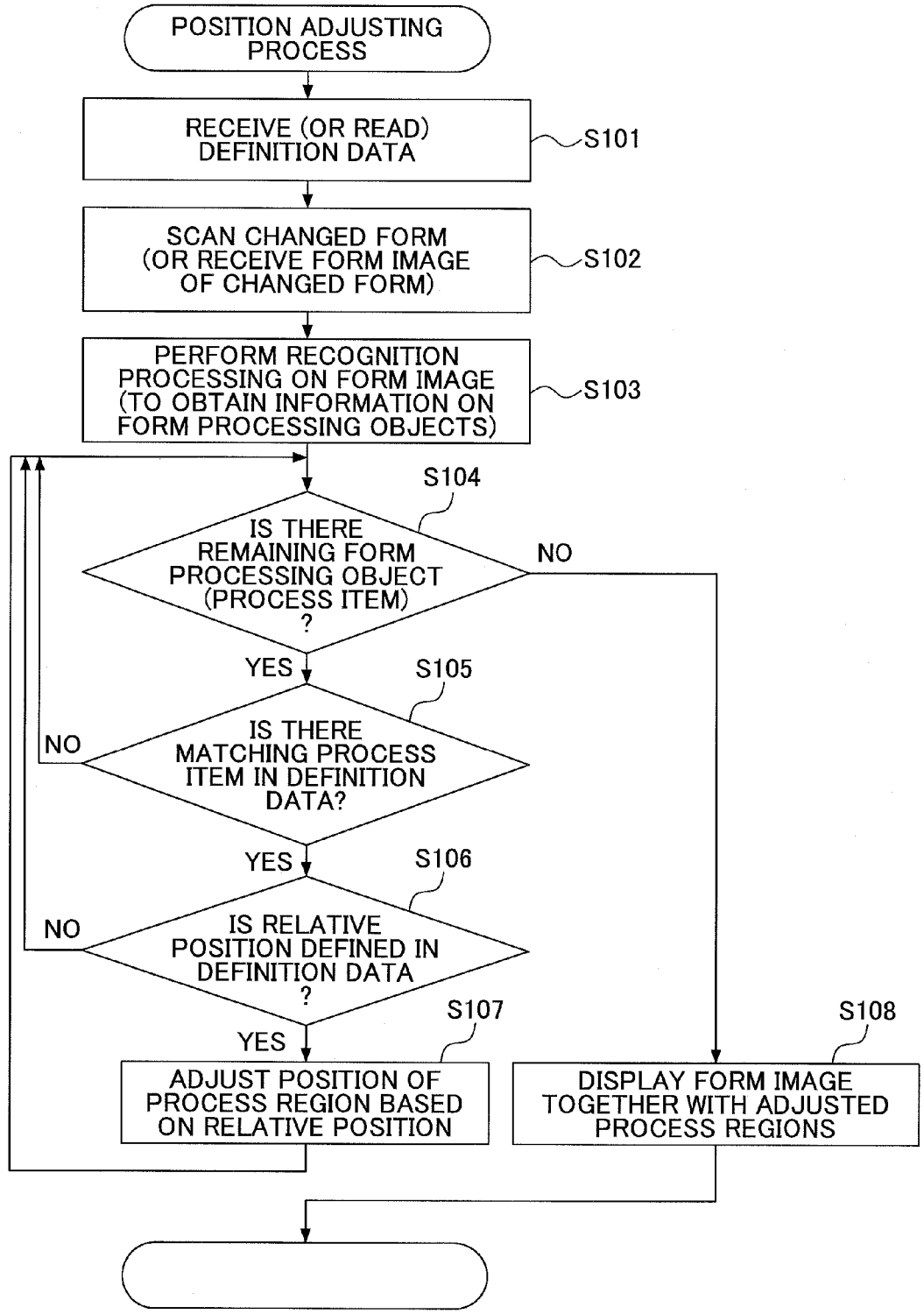

FIG.11A

XY LEASE

PROPERTY NAME | PAYMENT

LEASE AGREEMENT

LESSEE

GUAR-ANTOR

XY LEASE

LEASE AGREEMENT

LESSEE

GUAR-
ANTOR

PROPERTY
NAME

PAYMENT

12

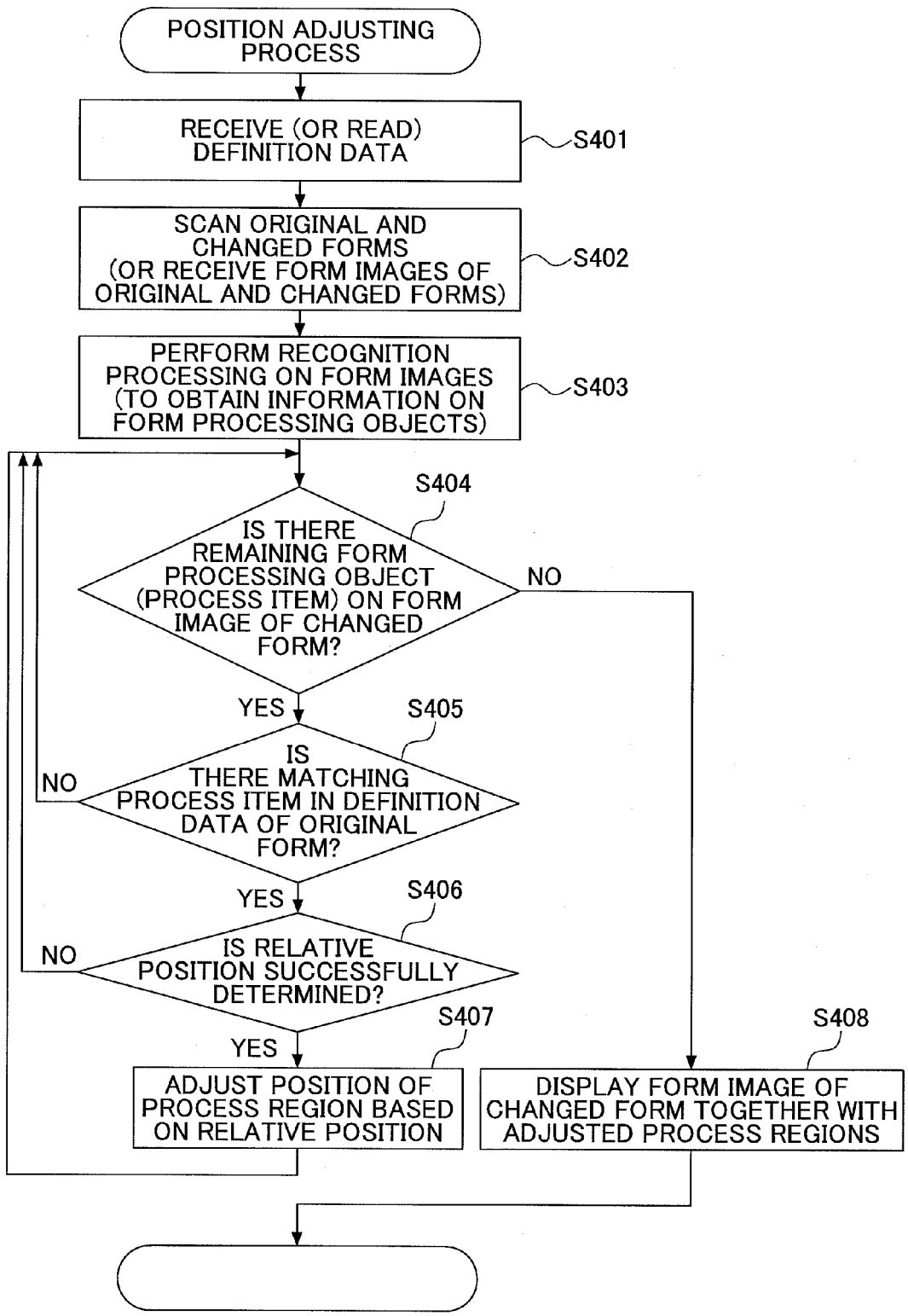

FORM PROCESSING APPARATUS, FORM PROCESSING METHOD, AND STORAGE MEDIUM FOR UPDATING DEFINITION DATA

CROSS-REFERENCE TO RELATED APPLICATION

The present application is based upon and claims the benefit of priority of Japanese Patent Application No. 2010-204858, filed on Sep. 13, 2010, the entire contents of which are incorporated herein by reference.

BACKGROUND OF THE INVENTION

1. Field of the Invention

An aspect of this disclosure relates to form processing technologies.

2. Description of the Related Art

Definition data defining, for example, process items, process regions, and process information of a form are used to scan and process the form. Technologies for making it easier to update the definition data have been proposed.

For example, Japanese Laid-Open Patent Publication No. 2002-298081 discloses a technology that makes it possible to easily generate definition data by combining templates representing definition elements of entry fields. Also, Japanese Laid-Open Patent Publication No. 2001-126010 discloses a technology that makes it possible to simplify and automate a process of generating definition data. In the disclosed technology, box regions surrounded by lines and the properties of the lines are extracted from a form image obtained by scanning a form, characters (or character strings) obtained by character recognition are compared with keywords representing process items and registered in a dictionary, box regions located close to the characters (or character strings) that match the keywords are identified as entry fields, and region information of the identified box regions and the properties of the lines are output according to a predetermined format.

However, with the disclosed technologies, it is difficult to efficiently update definition data.

With the technology disclosed in Japanese Laid-Open Patent Publication No. 2002-298081, when the layout of a form is changed, the user needs to select templates to be applied to entry fields of the form. Thus, the disclosed technology requires manual operations to update definition data and therefore does not improve the efficiency of updating definition data. With the technology disclosed in Japanese Laid-Open Patent Publication No. 2001-126010, even when the layout of a form is changed only slightly, updating the definition data of the form takes as much time as needed to generate new definition data from the form. Thus, this technology also does not make it possible to efficiently update definition data.

SUMMARY OF THE INVENTION

In an aspect of this disclosure, there is provided a form processing apparatus including a storing unit configured to store definition data for scanning and processing a first form in a storage area, an image input unit configured to scan a second form to obtain a form image, a position adjusting unit configured to adjust a position of a process region representing an entry field of a process item on the form image based on a relative position of the entry field of the corresponding process item on the first form and to associate the process region on the form image with definition information of the process item defined in the definition data, and an updating unit configured to update the definition information by changing a value indicating the position of the process region in the definition information to a value indicating the adjusted position of the process region. The relative position of the entry field is defined in the definition data relative to an item header of the process item on the first form.

BRIEF DESCRIPTION OF THE DRAWINGS

FIG. 1 is a block diagram illustrating an exemplary hardware configuration of a form processing apparatus;

FIGS. 2A through 2D are drawings used to describe problems in related-art form processing;

FIG. 4 is a drawing illustrating exemplary definition data;

FIGS. 6A and 6B are drawings used to describe an example of updating definition data;

FIG. 7 is a drawing illustrating an exemplary configuration screen;

FIG. 8 is a drawing illustrating exemplary definition data including a newly added process item;

FIG. 9 is a flowchart illustrating an exemplary position adjusting process according to the first embodiment;

FIGS. 11A and 11B are drawings used to describe an exemplary layout change of a form;

FIG. 13 is a flowchart illustrating an exemplary position adjusting process according to the second embodiment.

DESCRIPTION OF THE PREFERRED EMBODIMENTS

Figure 3:
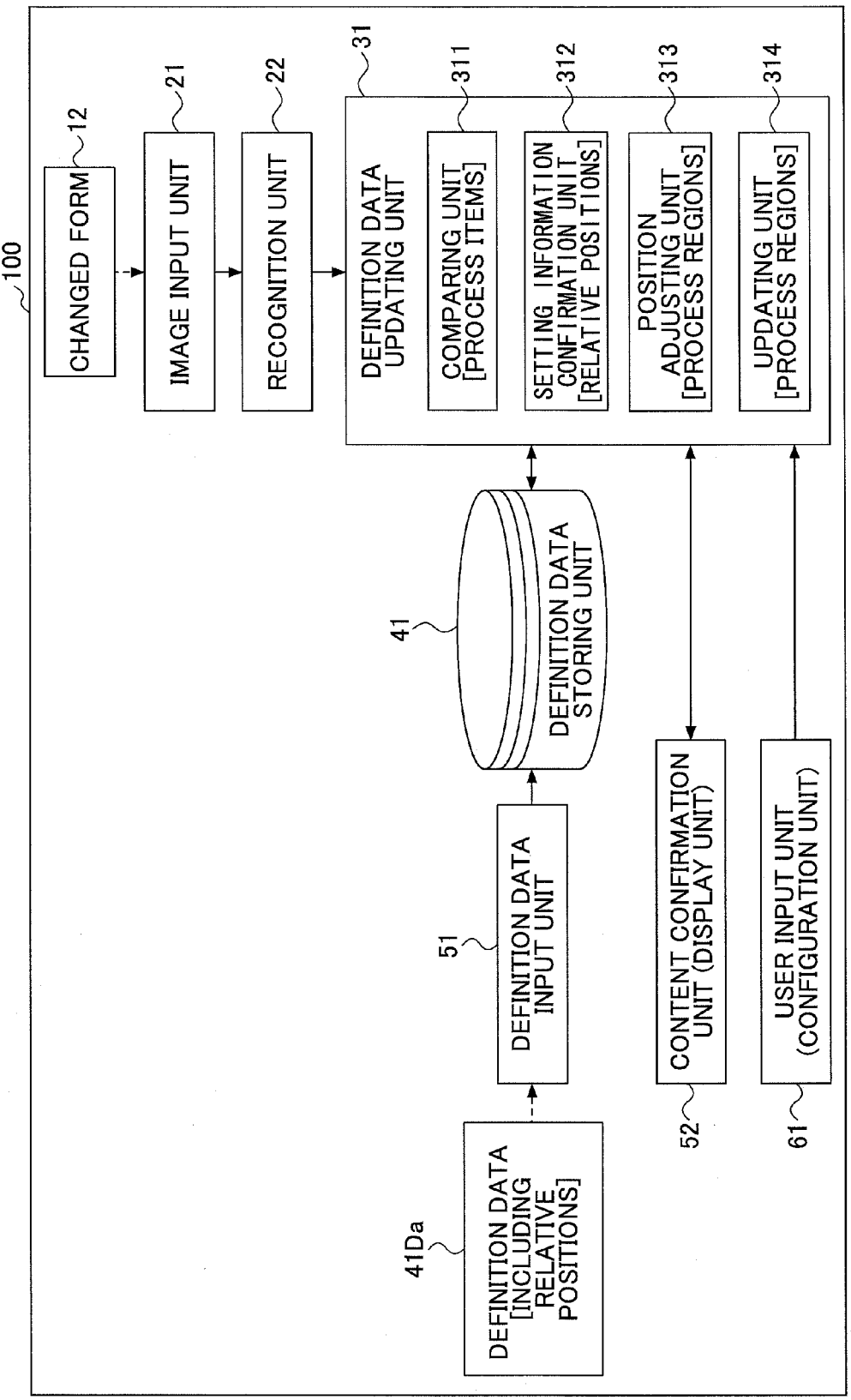
FIG. 3 is a block diagram illustrating an exemplary functional configuration of a form processing apparatus according to a first embodiment.

Preferred embodiments of the present invention are described below with reference to the accompanying drawings.

First Embodiment

Hardware Configurations

FIG. 1 is a block diagram illustrating an exemplary hardware configuration of a form processing apparatus 100 according to a first embodiment.

As illustrated in FIG. 1, the form processing apparatus 100 includes a controller 110, an operations panel 120, and a scanner 130 that are connected to each other via a bus B.

The operations panel 120 includes a display unit for providing information such as apparatus information to the user and an input unit for receiving user inputs such as settings and instructions. The scanner 130 optically scans a document and generates image data.

The controller 110 includes a central processing unit (CPU) 111, a storage unit 112, a network I/F 113, and an external storage I/F 114 that are connected via the bus B.

The CPU 111 executes programs and thereby controls the entire form processing apparatus 100. The storage unit 112 stores programs and data (e.g., image data). The storage unit 112, for example, includes a random access memory (RAM) implemented by a volatile memory, a read, only memory (ROM) implemented by a non-volatile memory, and a hard disk drive (HDD) as a mass storage. The RAM is used as a work area (a storage area where programs and data are temporarily stored) by the CPU 111. The ROM and the HDD store the programs and data. The CPU 111 loads programs from the ROM and/or the HDD into the RAM and executes the loaded programs.

The network I/F 113 is an interface for connecting the form processing apparatus 100 to a data communication channel N such as a network. The form processing apparatus 100 can communicate with external apparatuses having communication functions via the network I/F 113.

The external storage I/F 114 is an interface for connecting a storage medium 114a used as an external storage to the form processing apparatus 100. The storage medium 114a is, for example, implemented by a secure digital (SD) memory card, a universal serial bus (USE) memory, a CD-RW, or a DVD-RW. The form processing apparatus 100 can read and write data from and to the storage medium 114a via the external storage I/F 114.

With the above hardware configuration, the form processing apparatus 100 can provide various form processing functions (services).

<Form Processing Functions>

Exemplary form processing functions of the form processing apparatus 100 are described below.

The form processing apparatus 100 scans a form to obtain a form image and performs recognition processing on the form image to identify form processing objects. The form processing apparatus 100 refers to input definition data and determines whether the relative positions of entry fields (process regions) expressed relative to item headers on the form are defined in the definition data in association with definition information of respective process items that match the identified form processing objects. The definition information of each process item may include, for example, the position of a process region and process information indicating a process to be performed on the process region. Based on the relative positions, the form processing apparatus 100 adjusts the positions of the process regions (representing entry fields) on the form image and associates the process regions on the form image with the definition information of the corresponding process items in the definition data. When the positions of the process regions with reference to the origin of the form image defined in the corresponding definition information are different from the adjusted positions of the process regions, the form processing apparatus 100 updates the definition information.

FIGS. 2A through 2D are drawings used to describe problems in related-art form processing.

FIG. 2A illustrates an "original" form 11 and FIG. 2B illustrates a "changed" form 12 that is obtained by changing the form 11. A new process item indicated by an item header "Maker" has been added to the changed form 12 between process items indicated by item headers "Property Name" and "Payment" and as a result, the layout of the form 11 has been changed. When the layout of a form is changed as exemplified above, it is necessary to also change definition data used to scan and process the form.

Definition data of a form include, for example, positions (e.g., coordinates with reference to the origin of the form image) of entry fields (process regions) of respective process items (information items to be processed) on the form and process information (process names) indicating processes to be performed on the entry fields. For example, the definition data of the form 11 define the positions of entry fields of process items indicated by item headers "Lessee", "Guarantor", "Property Name", and "Payment", and process information indicating processes to be performed on the entry fields (e.g., a partial image storing process for the entry field associated with the process item indicated by item header "Lessee", a pixelization process for the entry field associated with the process item indicated by item header "Guarantor", and optical character recognition (OCR) processes for the entry fields associated with the process items indicated by item headers "Property Name" and "Payment"). Based on the definition data, process regions R1 through R4 as illustrated in FIG. 2C are identified on a form image G1 obtained by scanning the form 11 and the defined processes are performed on the identified process regions R1 through R4.

Accordingly, if the definition data of the original form 11 are used to scan and process the changed form 12, the OCR processes cannot be accurately performed on the process regions R3 and R4 of the process items indicated by item headers "Property Name" and "Payment" on a form image G2 obtained by scanning the changed form 12. This is because the positions of the process regions R3 and R4 (or the entry fields) of the process items indicated by item headers "Property Name" and "Payment" have been changed as illustrated in FIG. 2D as a result of the layout change to the form 11.

In the descriptions below, "form image G" may be used as a generic term referring to the form image G1 obtained by scanning the form 11 and the form image G2 obtained by scanning the form 12. Also, "process region R" may be used as a generic term referring to the process regions R1 through R4.

In related-art technologies, to prevent the above described problems, definition data of a changed form are manually updated by the user (e.g., by changing templates to be applied) or definition data of the changed form are automatically regenerated (or rebuild). With the related-art methods, however, it is difficult to efficiently update definition data even when a form is changed only slightly. Since changes such as addition of process items are frequently made to forms, it is preferable to more efficiently update definition data.

According to the first embodiment, the form processing apparatus 100 associates the process regions R (representing the entry fields) on the form image G with the definition information of the corresponding process items based on the relative positions of the entry fields expressed relative to the corresponding item headers on the form. When the positions of the process regions R with reference to the origin of the form image G defined in the corresponding definition information are different from the adjusted positions of the process regions R, the form processing apparatus 100 updates values indicating the positions of the process regions R in the definition information.

This configuration makes it possible to update only portions of the definition data corresponding to the differences between the original form 11 and the changed form 12 and thereby makes it possible to efficiently update the definition data.

Exemplary functional configurations and operations of the form processing apparatus 100 are described below.

FIG. 3 is a block diagram illustrating an exemplary functional configuration of the form processing apparatus 100 according to the first embodiment.

As illustrated in FIG. 3, the form processing apparatus 100 includes an image input unit 21, a recognition unit 22, a definition data updating unit 31, a definition data storing unit 41, a definition data input unit 51, a content confirmation unit (display unit) 52, and a user input unit (configuration unit) 61.

The image input unit 21 is a functional unit that scans a form with, for example, the scanner 130 to obtain a form image G. In this example, the image input unit 21 scans the changed form 12 to obtain the form image G2.

The recognition unit 22 performs recognition processing on the form image G. The recognition processing includes, for example, table recognition (matrix structure recognition) based on lines, and character (or character string) recognition. Through the recognition processing, the recognition unit 22 obtains partial images, image areas (indicated, for example, by coordinates with reference to the origin of the form image G), and characters (or character strings) on the form image G, and identifies form processing objects such as process items which include item headers and entry fields (or process regions) on the scanned form. For example, the recognition unit 22 identifies process items including item headers and entry fields on the form image G2 of the changed form 12.

The definition data updating unit 31 is a functional unit that updates input definition data 41D to match the scanned form. The definition data 41D are input via the definition data input unit 51 and are stored in the definition data storing unit 41. The definition data storing unit 41 is, for example, implemented by a storage area of the storage unit 112 of the form processing apparatus 100. The definition data updating unit 31 accesses the definition data storing unit 41 and updates the definition data 41D to match the scanned form. In FIG. 3, it is assumed that definition data 41Da of the original form 11 are input and updated to match the changed form 12.

An exemplary configuration of the definition data 41D is described below using the definition data 41Da.

FIG. 4 is a drawing illustrating a configuration of the definition data 41Da of the original form 11.

The definition data 41Da include definition information for each process item on the form 11. Each set of definition information includes the position of a process region R indicated by coordinates with reference to the origin of the form image G1 and process information (e.g., character string) indicating a process to be performed on the process region R. Thus, the definition data 41Da includes multiple sets of definition information for respective process items.

Also, setting information including an item name of the process item and a relative position of the entry field with respect to the item header is defined in association with the definition information. The relative position indicates the position of the entry field relative to the position of the corresponding item header on the form image G.

For example, the relative position is expressed as described below.

Referring to the form 11 of FIG. 2A, the entry field of the process item indicated by the item header "Lessee" has three rows and one column and is located to the right of the item header "Lessee". In this case, the relative position of the entry field with respect to the item header "Lessee" is expressed as "Right, 3 rows, 1 column". In the definition data 41Da, setting information D1 including the relative position "Right, 3 rows, 1 column" and the item name is associated with the definition information of the process item indicated by the item header "Lessee".

Similarly, the entry field of the process item indicated by the item header "Guarantor" has three rows and one column and is located to the right of the item header "Guarantor". Accordingly, in the definition data 41Da, setting information D2 including the relative position "Right, 3 rows, 1 column" and the item name is associated with the definition information of the process item indicated by the item header "Guarantor".

The entry field of the process item indicated by the item header "Property Name" has one row and one column and is located to the right of the item header "Property Name". In this case, the relative position of the entry field with respect to the item header "Property Name" is expressed as "Right, 1 row, 1 column". In the definition data 41Da, setting information D3 including the relative position "Right, 1 row, 1 column" and the item name is associated with the definition information of the process item indicated by the item header "Property Name".

Similarly, the entry field of the process item indicated by the item header "Payment" has one row and one column and is located to the right of the item header "Payment". Accordingly, in the definition data 41Da, setting information D4 including the relative position "Right, 1 row, 1 column" and the item name is associated with the definition information of the process item indicated by the item header "Payment".

In the descriptions below, the definition data 41Da with the above described configuration are used.

The definition data updating unit 31 updates the definition data 41Da (including the relative positions) as described below.

Based on the relative positions of the entry fields defined in the definition data 41Da of the form 11, the definition data updating unit 31 adjusts the positions of the process regions R (representing the entry fields) on the form image G2 of the form 12. By adjusting the positions of the process regions R, the definition data updating unit 31 associates the process regions R on the form image G2 with the definition information of the corresponding process items defined in the definition data 41Da. When the positions of the process regions R defined in the corresponding definition information are different from the adjusted positions (absolute positions) of the process regions R, the definition data updating unit 31 updates the definition information.

For the above process, the definition data updating unit 31 includes a comparing unit 311, a setting information confirmation unit 312, a position adjusting unit 313, and an updating unit 314.

The comparing unit 311 is a functional unit that compares process items identified on the form image G2 with the process items defined in the definition data 41Da and thereby determines whether the process items on the form image G2 match the process items defined in the definition data 41Da. For example, the comparing unit 311 compares the item names of the process items or compares partial images representing the item headers of the process items. In the former case, the comparing unit 311 compares character strings of the item names in the information on identified form processing objects (i.e., information obtained by the recognition unit 22 from the form image G2) with character strings of the item names defined in the definition data 41Da. In the latter case, the comparing unit 311 compares partial images of the item headers in the information on identified form processing objects with partial images of the item headers defined in the definition data 41Da. In this case, instead of the item names, the partial images of the item headers are included in the definition data 41Da together with the relative positions.

When the process items on the form image G2 match the process items defined in the definition data 41Da, the comparing unit 311 determines that the form image G2 includes the same process items as those defined in the definition data 41Da and determines that the positions of the process regions R of the matching process items need to be confirmed. For example, when the process items on the form image G2 of the changed form 12 are compared with the process items defined in the definition data 41Da of the original form 11, the process items other than the process item indicated by the item header "Maker" on the form image G2 match the process items in the definition data 41Da. In this case, the comparing unit 311 determines that the positions of the process regions R of the process items other than the process item indicated by the item header "Maker" need to be confirmed.

The setting information confirmation unit 312 is a functional unit that determines, based on the determination results of the comparing unit 311, whether the relative positions of the entry fields are defined in the definition data 41Da in association with the definition information of the matching process items. For example, the setting information confirmation unit 312 refers to the definition data 41D and determines that the relative position "Right, 1 row, 1 column" is defined in association with the definition information of the process item indicated by the item header "Property Name".

Based on the determination results of the setting information confirmation unit 312, the position adjusting unit 313 adjusts the positions of the process regions R of the matching process items on the form image G2. First, the position adjusting unit 313 identifies the positions of partial images of the item headers of the matching process items on the form image G2 based on the information on the form processing objects (which includes, for example, values indicating areas of the partial images representing the item headers). Next, the position adjusting unit 313 adjusts the positions of the process regions R of the matching process items based on the relative positions of the entry fields and the identified positions of the partial images of the item headers.

Taking the process item indicated by the item header "Property Name" as an example, the position adjusting unit 313 identifies the position of the partial image of the item header "Property Name" on the form image G2 based on the coordinates indicating the area of the partial image with reference to the origin of the form image G2. Next, the position adjusting unit 313 adjusts the position of the process region R3 (that represents the entry field of the process item indicated by the item header "Property Name") with reference to the identified position of the partial image of the item header "Property Name" based on the relative position "Right, 1 row, 1 column" of the entry field. As a result, an area of one row and one column which is located to the right of the item header "Property Name" is determined as the process region R3 on the form image G2.

Thus, the definition data updating unit 31 adjusts the positions of the process regions R representing the entry fields of the matching process items on the form image G2 and associates the process regions R with the definition information of the corresponding process items defined in the definition data 41Da.

Figure 5:
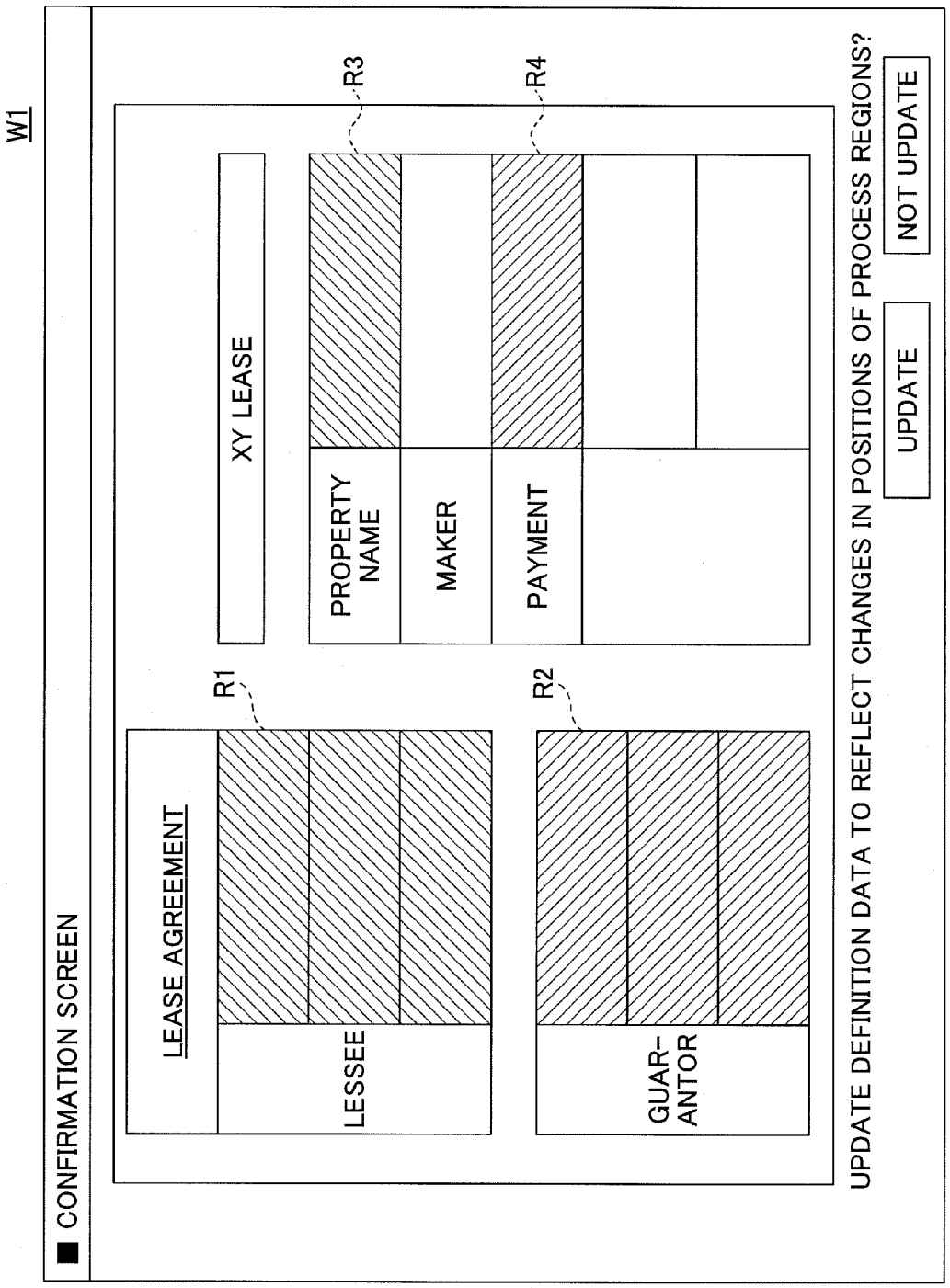
FIG. 5 is a drawing illustrating an exemplary confirmation screen.

FIG. 5 is a drawing illustrating an exemplary confirmation screen W1.

As illustrated in FIG. 5, the confirmation screen W1 displays the positions of the process regions R1 through R4 on the form image G2 which have been adjusted through a process as described above.

The confirmation screen W1 is displayed by the content confirmation unit 52. The content confirmation unit 52 receives the adjusted positions of the process regions R1 through R4 and displays them on the operations panel 120 of the form processing apparatus 100.

The confirmation screen W1 enables the user to visually confirm the process items on the changed form 12 that match the process items defined in the definition data 41Da of the original form 11. This in turn enables the user to easily identify a new process item added when the layout of the form 11 is changed.

The confirmation screen W1 also includes graphical user interfaces (GUIs) that allow the user to select whether to update the definition data 41Da to reflect the changes in the positions of the process regions R. In this example, buttons "Update" and "Not Update" are provided on the confirmation screen W1. When one of the buttons is selected by the user, the content confirmation unit 52 sends a corresponding instruction (Update or Not Update) to the definition data updating unit 31.

Referring back to FIG. 3, when the instruction indicates "Update", the updating unit 314 of the definition data updating unit 31 updates the definition data 41Da.

More specifically, the updating unit 314 changes the values indicating the positions of the process regions R in the definition information associated with the process regions R on the form image G2 to the values indicating the adjusted positions. The updating unit 314 changes only the values of the positions of the process regions R that have been adjusted. Note that the positions of the process regions R are indicated, for example, by coordinates with reference to the origin of the form image G2 and are different from the relative positions of the entry fields expressed relative to the item headers.

FIGS. 6A and 6B are drawings used to describe an example of updating definition data.

FIG. 6A illustrates original definition data $41Da_1$ and FIG. 6B illustrates updated definition data $41Da_2$.

For example, in a case where the changed form 12 is scanned and the definition data $41Da_1$ of the original form 11 are input, the updating unit 314 updates the definition data $41Da_1$ and thereby obtains the definition data $41Da_2$.

In the changed form 12, the process item indicated by the item header "Maker" has been added between the process items indicated by the item headers "Property Name" and "Payment".

However, the positions of the entry fields of the process items indicated by the item headers "Lessee" and "Guarantor" in the changed form 12 are the same as those in the original form 11. Therefore, the updating unit 314 does not update the positions (coordinates) of the process regions R1 and R2.

Meanwhile, the positions of the entry fields of the process items indicated by the item headers "Property Name" and "Payment" in the changed form 12 are different from those in the original faun 11. Therefore, the updating unit 314 overwrites data D5 and D6 indicating the positions of the process regions R3 and R4 (expressed with reference to the origin of the form image G2) with the adjusted coordinates of the process regions R3 and R4.

Thus, the above configuration makes it possible to accurately identify the process regions R on the form image G2 even when the positions of the entry fields are changed as a result of the layout change.

FIG. 7 is a drawing illustrating an exemplary configuration screen W2.

The configuration screen W2 includes a "Region Information" tab for setting region information on the process region of the process item indicated by the item header "Maker" that has been added as a result of the layout change of the form 11. The configuration screen W2 may be displayed, for example, when the item header "Maker" on the confirmation screen W1 is selected with a pointing device.

As described above, the user can confirm a new process item, which is added when the layout of a form is changed, on the confirmation screen W1 displayed by the content confirmation unit 52. The user input unit 61 displays the configuration screen W2 to allow the user to define the position of the process region R of the new process item and process information indicating a process to be performed on the process region R (definition information) and to set the item name and the relative position of the process region R (setting information) to be associated with the definition information. The user input unit 61 receives values input on the configuration screen W2 and sends the values to the definition data updating unit 31.

Referring back to FIG. 3, the definition data updating unit 31 updates the definition data 41D$a$ based on the values received from the user input unit 61.

FIG. 8 illustrates definition data 41D$a_3$ including information on the newly added process item indicated by the item header "Maker".

When the definition information and the setting information for the process item indicated by the item header "Maker" are received from the user input unit 61, the updating unit 314 of the definition data updating unit 31 updates the definition data 41D$a_2$. More specifically, the updating unit 314 adds data D7 including the definition information and the setting information to the definition data 41D$a_2$ according to a predetermined format.

Here, unlike the position of the process region R and the process information, the item name and the relative position of the process region R are not essential. For example, the item name and the relative position of the process region R may be provided for a process item that is expected to be frequently changed.

As described above, in the form processing apparatus 100 of this embodiment, form processing functions (or services) are provided by collaboration of the above described functional units. The functional units are implemented by executing software programs installed in the form processing apparatus 100. For example, the software programs are loaded by the CPU 111 from the storage unit 112 (e.g., the HDD and/or the ROM) into a memory (e.g., a RAM) and are executed to implement the functional units of the form processing apparatus 100.

Exemplary processes performed by the functional units of the form processing apparatus 100 (collaboration between the functional units) are described below with reference to flowcharts.

<Position Adjusting Process>

FIG. 9 is a flowchart illustrating an exemplary position adjusting process according to the first embodiment. In this exemplary process, it is assumed that the changed form 12 is scanned and the definition data 41D$a$ of the original form 11 including the relative positions of the entry fields are input.

As illustrated in FIG. 9, the definition data input unit 51 receives (or reads) the definition data 41D$a$ of the original form 11 (step S101). The definition data input unit 51 stores the received definition data 41D$a$ in the definition data storing unit 41.

Next, the image input unit 21 scans the changed form 12 and thereby obtains the form image G2 (step S102).

The recognition unit 22 performs recognition processing on the form image G2 (step S103). In this step, the recognition unit 22 obtains recognition results such as partial images, image areas, and characters (or character strings) on the form image G2 and identifies form processing objects such as process items which include item headers and entry fields (or process regions) on the form 12.

Based on the recognition results, the form processing apparatus 100 determines whether there is a form processing object (i.e., a process item) on the form image G2 for which the position adjusting process has not been performed (step S104). If such a process item is present (YES in step S104), the definition data updating unit 31 performs the position adjusting process as described below.

The comparing unit 311 of the definition data updating unit 31 compares the process item on the form image G2 with process items defined in the definition data 41D$a$ stored in the definition data storing unit 41 and thereby determines whether the process item on the form image G2 matches one of the process items defined in the definition data 41D$a$ (step S105).

If the process item matches (YES in step S105), the setting information confirmation unit 312 of the definition data updating unit 31 determines whether the relative position of the entry field is defined in association with the definition information of the matching process item (step S106).

If the relative position is defined (YES in step S106), the position adjusting unit 313 of the definition data updating unit 31 adjusts, based on the relative position, the position of the process region R representing the entry field of the matching process item on the form image G2 (step S107). More specifically, the position adjusting unit 313 identifies the position of the partial image representing the item header of the matching process item on the form image G2 based on the information on the form processing objects (i.e., the recognition results). Next, the position adjusting unit 313 adjusts the position of the process region R of the matching process item with reference to the identified position of the partial image of the item header based on the relative position of the entry field that is defined in association with the definition information of the matching process item.

Then, the process returns to step S104, and the definition data updating unit 31 repeats steps S105 through S107 on form processing objects (i.e., process items) for which the position adjusting process has not been performed.

Meanwhile, if the process item on the form image G2 does not match any one of the process items defined in the definition data 41D$a$ (NO in step S105) or if the relative position of the entry field is not defined in association with the definition information of the matching process item (NO in step S106), the definition data updating unit 31 returns to step S104 without performing the position adjusting process of step S107.

When the position adjusting process is performed for all of the form processing objects (i.e., the process items) on the form image G2 (NO in step S104), the definition data updating unit 31 sends the results of the position adjusting process (es) to the content confirmation unit 52.

The content confirmation unit 52 displays the form image G2 together with the position-adjusted process regions R on the operations panel 120 of the form processing apparatus 100 (step S108). The content confirmation unit 52 displays the position-adjusted process regions R in such a manner that the position-adjusted process regions R are visually distinguishable.

<Definition Data Updating Process>

Figure 10A:
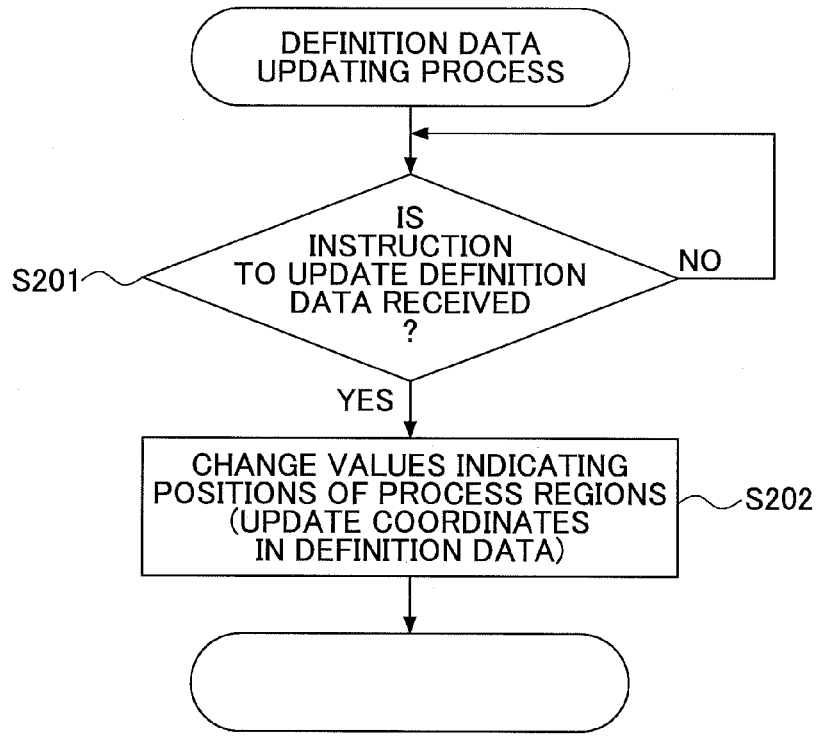
FIG. 10A is a flowchart illustrating an exemplary process of updating definition data.
Figure 10B:
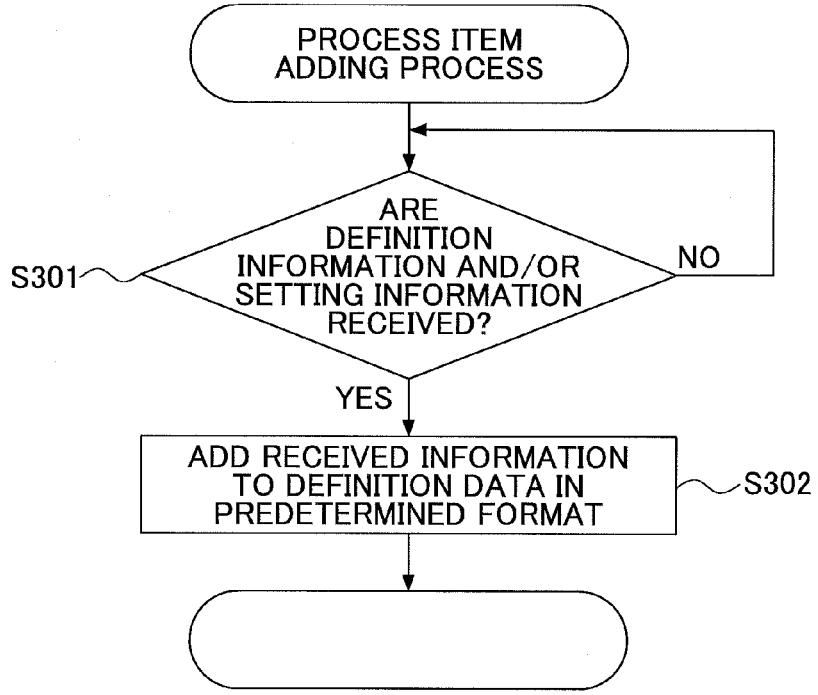
FIG. 10B is a flowchart illustrating another exemplary process of updating definition data.

FIGS. 10A and 10B are flowcharts illustrating exemplary processes of updating the definition data 41D$a$. The processes of FIGS. 10A and 10B are initiated in response to user instructions after the position adjusting process.

In the process of FIG. 10A, the values indicating the positions of the process regions R in the definition data 41D$a$ are updated.

As illustrated in FIG. 10A, when an instruction to update the definition data 41D$a$ is received from the content confirmation unit 52 (YES in step S201), the updating unit 314 of the definition data updating unit 31 changes the values (e.g., coordinates with reference to the origin of the form image) indicating the positions of the process regions R in the definition information associated with the process regions R on the form image G2 to the values indicating the adjusted positions (step S202). The updating unit 314 changes only the values indicating the positions of the process regions R that have been adjusted.

In the process of FIG. 10B, definition information of a process item is added to the definition data 41Da.

As illustrated in FIG. 10B, when the definition information (e.g., the position of the process region and the process information) and/or the setting information (e.g., the item name and the relative position of the process region) of an added process item is received from the user input unit 61 (YES in step S301), the updating unit 314 of the definition data updating unit 31 adds the received information to the definition data 41Da in a predetermined format (step S302).

SUMMARY

As described above, the form processing apparatus 100 of this embodiment adjusts the positions of the process regions R (representing the entry fields of the process items) on the form image G2 of the form 12 based on the relative positions of the entry fields defined in the definition data 41Da of the form 11. As a result, the process regions R on the form image G2 are associated with the definition information of the corresponding process items defined in the definition data 41Da. When the positions of the process regions R with reference to the origin of the form image G2 defined in the associated definition information are different from the adjusted positions of the process regions R, the form processing apparatus 100 updates the definition information.

This configuration makes it possible to use the definition data 41Da of the original form 11 and update only portions of the definition data 41Da corresponding to the differences between the original form 11 and the changed form 12. Thus, this configuration makes it possible to efficiently update the definition data 41Da to match the changed form 12.

In the above descriptions, a case where a new process item is added to a form is used as an example. However, the above embodiment may also be applied to other cases. For example, the above embodiment may be applied to a case as illustrated by FIGS. 11A and 11B where the types and the number of process items are unchanged but their positions are changed. Further, the above embodiment may also be applied to a case where definition data of a form are modified to match a similar form.

Second Embodiment

In the first embodiment, configurations and processes for updating definition data including the relative positions of entry fields are described. In a second embodiment, configurations and processes for updating definition data not including the relative positions of entry fields are described.

In the second embodiment, descriptions overlapping those in the first embodiment are omitted, and the same reference numbers as those used in the first embodiment are assigned to the corresponding components. In the descriptions below, "definition data 41D$_b$" is used as a generic term referring to definition data including the relative positions of entry fields and definition data not including the relative positions of entry fields.

<Form Processing Functions>

Figure 12:
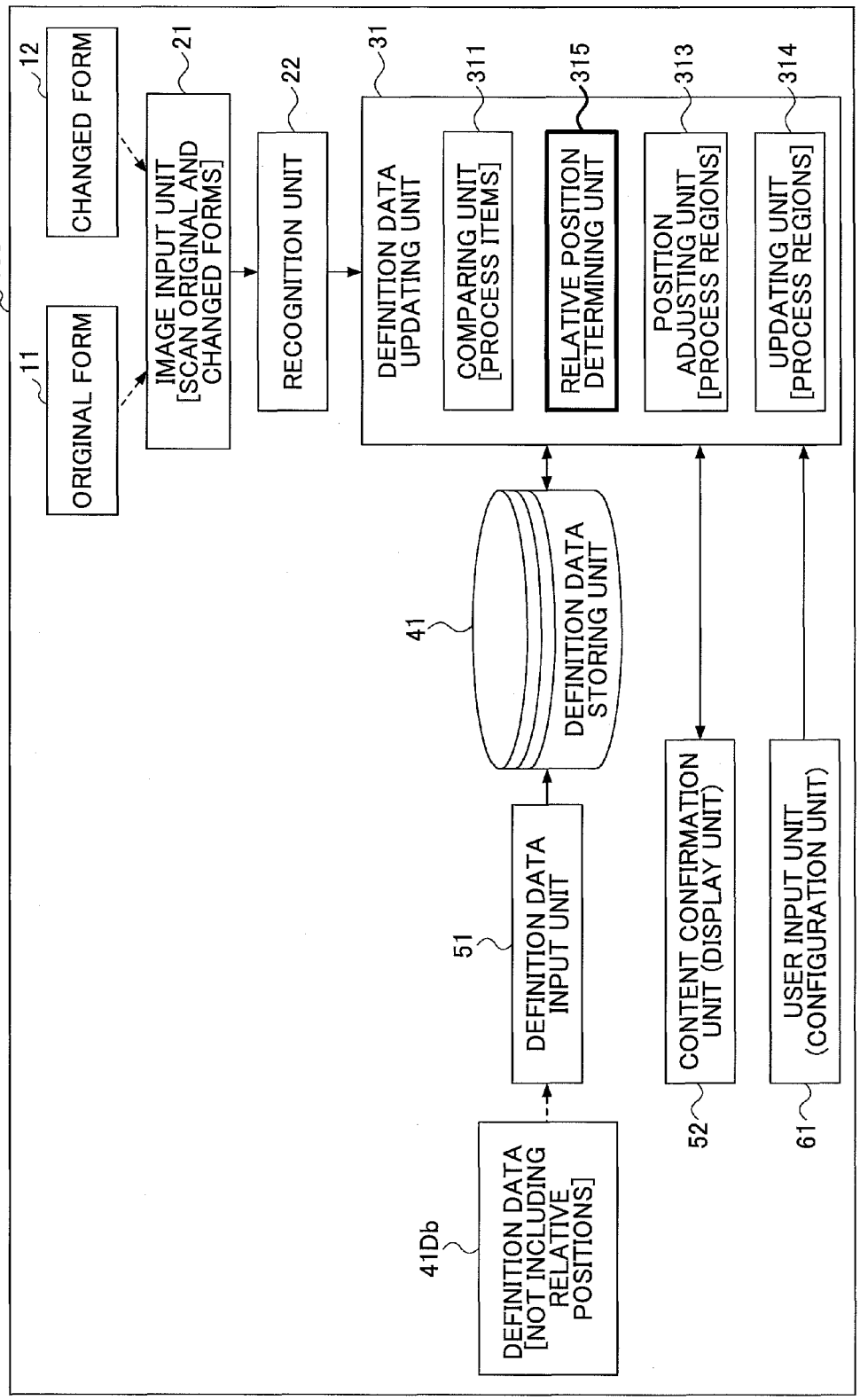
FIG. 12 is a block diagram illustrating an exemplary functional configuration of a form processing apparatus according to a second embodiment.

FIG. 12 is a block diagram illustrating an exemplary functional configuration of the form processing apparatus 100 according to the second embodiment.

As illustrated in FIG. 12, the definition data updating unit 31 of this embodiment includes a relative position determining unit 315 instead of the setting information confirmation unit 312.

In this embodiment, the image input unit 21 scans the original form 11 to obtain the form image G1 and scans the changed form 12 to obtain the form image G2. The recognition unit 22 performs recognition processing on the form images G1 and G2, and thereby obtains recognition results such as partial images, image areas, and characters (or character strings) on the form images G1 and G2. Based on the recognition results, the recognition unit 22 identifies form processing objects such as process items which include item headers and entry fields (or process regions) on the forms 11 and 12, and sends information on the identified form processing objects together with the form images G1 and G2 to the definition data updating unit 31.

The definition data input unit 51 receives the definition data 41Db of the original form 11 which do not include the relative positions of the entry fields and stores the definition data 41Db in the definition data storing unit 41. The comparing unit 311 compares the process items identified on the form image G2 with the process items defined in the definition data 41Db and thereby determines whether the process items on the form image G2 match the process items defined in the definition data 41Db.

Since the definition data 41Db of the original form 11 do not include the relative positions of the entry fields, the relative position determining unit 315 of the definition data updating unit 31 determines the relative positions of the process regions R representing the entry fields based on the form image G1 of the original form 11.

The relative position determining unit 315 identifies the positions of partial images of the item headers of the matching process items on the form image G1 of the original form 11. Then, the relative position determining unit 315 determines the relative positions of the process regions R on the form 11 with reference to the identified positions of the partial images.

Based on the determined relative positions of the process regions R on the original form 11, the position adjusting unit 313 of the definition data updating unit 31 adjusts the positions of the process regions R on the form image G2 of the changed form 12. As a result, the process regions R on the form image G2 of the changed form 12 are associated with the definition information of the corresponding process items defined in the definition data 41Db of the original form 11.

<Position Adjusting Process>

FIG. 13 is a flowchart illustrating an exemplary position adjusting process according to the second embodiment. In this exemplary process, it is assumed that both the original form 11 and the changed form 12 are scanned and the definition data 41Db of the original form 11 are input. The definition data 41Db do not include the relative positions of the entry fields.

As illustrated in FIG. 13, the definition data input unit 51 receives the definition data 41Db of the original form 11 (step S401). The definition data input unit 51 stores the received definition data 41Db in the definition data storing unit 41.

Next, the image input unit 21 scans the original form 11 and the changed form 12 and thereby obtains the form images G1 and G2 (step S402).

The recognition unit 22 performs recognition processing on the form images G1 and G2 (step S403). In this step, the recognition unit 22 obtains recognition results such as partial images, image areas, and characters (or character strings) on the form images G1 and G2 and identifies form processing objects such as process items which include item headers and entry fields (or process regions) on the forms 11 and 12.

Based on the recognition results, the form processing apparatus 100 determines whether there is a form processing object (i.e., a process item) on the form image G2 for which the position adjusting process has not been performed (step S404). If such a process item is present (YES in step S404), the definition data updating unit 31 performs the position adjusting process as described below.

The comparing unit 311 of the definition data updating unit 31 compares the process item on the form image G2 with process items defined in the definition data 41D$b$ stored in the definition data storing unit 41 and thereby determines whether the process item on the form image G2 matches one of the process items defined in the definition data 41D$b$ (step S405).

If the process item matches (YES in step S405), the relative position determining unit 315 determines the relative position of the process region R on the form image G1 relative to the position of the partial image of the item header representing the matching process item and determines whether the relative position is successfully determined (step S406).

If the relative position is successfully determined (YES in step S406), the position adjusting unit 313 of the definition data updating unit 31 adjusts, based on the relative position, the position of the process region R representing the entry field of the matching process item on the form image G2 (step S407). More specifically, the position adjusting unit 313 identifies the position of the partial image representing the item header of the matching process item on the form image G2 based on the information on the form processing objects (i.e., the recognition results) on the form image G2. Next, the position adjusting unit 313 adjusts the position of the process region R of the matching process item based on the determined relative position of the process region R and the identified position of the partial image of the item header.

Then, the process returns to step S404, and the definition data updating unit 31 repeats steps S405 through S407 on form processing objects (i.e., process items) for which the position adjusting process has not been performed.

Meanwhile, if the process item on the form image G2 does not match any one of the process items defined in the definition data 41D$b$ (NO in step S405) or if the relative position of the process region R is not successfully determined (NO in step S406), the definition data updating unit 31 returns to step S404 without performing the position adjusting process of step S407.

When the position adjusting process is performed for all of the form processing objects (i.e., the process items) on the form image G2 (NO in step S404), the definition data updating unit 31 sends the results of the position adjusting process (es) to the content confirmation unit 52.

The content confirmation unit 52 displays the form image G2 together with the position-adjusted process regions R on the operations panel 120 of the form processing apparatus 100 (step S408). The content confirmation unit 52 displays the position-adjusted process regions R in such a manner that the position-adjusted process regions R are visually distinguishable.

SUMMARY

As described above, the form processing apparatus 100 of this embodiment determines the relative positions of the process regions R on the form image G1 with reference to the positions of the partial images of the item headers. Based on the determined relative positions of the process regions R, the form processing apparatus 100 adjusts the positions of the process regions R (that correspond to the entry fields) on the form image G2 of the changed form 12. As a result, the process regions R on the form image G2 of the changed form 12 are associated with the definition information of the corresponding process items defined in the definition data 41D$b$ of the original form 11. When the positions of the process regions R with reference to the origin of the form image G2 defined in the associated definition information are different from the adjusted positions of the process regions R, the form processing apparatus 100 updates the definition information.

This configuration makes it possible to efficiently update the definition data 41D$b$ even when the relative positions of the entry fields (or process regions) are not defined in the definition data 41D$b$. Thus, the second embodiment also provides advantageous effects as in the first embodiment.

Accordingly, the second embodiment makes it possible to use conventional definition data that do not include the relative positions of entry fields. In other words, the second embodiment eliminates the need to prepare definition data including the relative positions of entry fields and thereby makes it possible to reduce the workload of the user. Further, the second embodiment makes it possible to reduce the size of definition data by not including the relative positions of entry fields and thereby makes it possible to reduce the amount of storage space for the definition data (i.e., the definition data storing unit 41).

The form processing functions of the above embodiments are implemented, for example, by executing a program(s), which is written in a programming language supported by the operating environment (platform) of the form processing apparatus 100, using a processing unit (e.g., the CPU 111) of the form processing apparatus 100.

Such a program may be stored in a non-transitory computer-readable storage medium (e.g., the storage medium 114$a$) such as a CD-ROM/RW, a DVD-ROM/RW, an SD card, or a USB memory. For example, the program stored in the storage medium 114$a$ may be installed in the form processing apparatus 100 via the external storage I/F 114. Alternatively, the program may be downloaded via a telecommunication line and the network I/F 113 and installed into the form processing apparatus 100.

The above embodiments may also be applied to related-art form recognition technologies. For example, Japanese Laid-Open Patent Publication No. 2000-29986 discloses a form recognition technology where a semi-fixed form whose layout is variable is recognized based on format information including information on process items on the form and process information indicating processes to be performed on process regions R corresponding to the entry fields of the process items.

When applied to the disclosed recognition technology, the above embodiments make it possible to associate the relative positions of entry fields with the format information of the corresponding process items and thereby make it possible to adjust the positions of process regions on a form image based on the relative positions of the entry fields (i.e., make it possible to associate the position-adjusted process regions with the process information). Thus, the above embodiments enable efficiently updating the format information.

The present invention is not limited to the specifically disclosed embodiments, and variations and modifications may be made without departing from the scope of the present invention.

An aspect of this disclosure makes it possible to provide a form processing apparatus, a form processing method, and a storage medium storing a form processing program that make it possible to efficiently update definition data used to scan and process a form.

What is claimed is:

1. A form processing apparatus, comprising:
a storing unit configured to store definition data for scanning and processing a first form in a storage area;
an image input unit configured to scan a second form to obtain a form image;
a position adjusting unit configured
to adjust a position of a process region representing an entry field of a process item on the form image based on a relative position of the entry field of the corresponding process item on the first form, the relative position being defined in the definition data relative to an item header of the process item on the first form, and
to associate the process region on the form image with definition information of the process item defined in the definition data; and
an updating unit configured to update the definition information by changing a value indicating the position of the process region in the definition information to a value indicating the adjusted position of the process region.

2. The form processing apparatus as claimed in claim 1, further comprising:
a recognition unit configured to perform recognition processing on the form image to identify a form processing object representing the process item on the form image;
a comparing unit configured to determine whether the process item on the form image matches the process item defined in the definition data of the first form; and
a confirmation unit configured to determine, if the process items match, whether the relative position of the entry field is defined in the definition data in association with the definition information of the process item,
wherein if the confirmation unit determines that the relative position of the entry field is defined in the definition data in association with the definition information, the position adjusting unit adjusts the position of the process region based on the relative position of the entry field.

3. The form processing apparatus as claimed in claim 2, wherein the position adjusting unit is configured
to identify a position of a partial image representing the item header of the process item on the form image based on information on the form processing object identified by the recognition unit, and
to adjust the position of the process region based on the relative position of the entry field and the identified position of the partial image.

4. The form processing apparatus as claimed in claim 1, wherein the updating unit is configured to update the definition information if the value indicating the position of the process region in the definition information is different from the value indicating the adjusted position of the process region.

5. The form processing apparatus as claimed in claim 1, further comprising: a display unit configured to display the process region at the adjusted position on the form image such that the process region is distinguishable from another process region of another process item.

6. The form processing apparatus as claimed in claim 1, further comprising:
a user input unit configured to allow a user to input information for the definition data via a graphical user interface,
wherein the updating unit is configured to update the definition data based on the input information.

7. A method of processing a form with a form processing apparatus, the form processing apparatus including a storing unit that stores definition data for scanning and processing a first form, the method comprising:
scanning a second form to obtain a form image;
adjusting a position of a process region representing an entry field of a process item on the form image based on a relative position of the entry field of the corresponding process item on the first form, the relative position being defined in the definition data relative to an item header of the process item on the first form;
associating the process region on the form image with definition information of the process item defined in the definition data; and
updating the definition information by changing a value indicating the position of the process region in the definition information to a value indicating the adjusted position of the process region.

8. A non-transitory computer-readable storage medium storing program code for causing a form processing apparatus to perform a method of processing a form, the form processing apparatus including a storing unit that stores definition data for scanning and processing a first form, the method comprising:
scanning a second form to obtain a form image;
adjusting a position of a process region representing an entry field of a process item on the form image based on a relative position of the entry field of the corresponding process item on the first form, the relative position being defined in the definition data relative to an item header of the process item on the first form;
associating the process region on the form image with definition information of the process item defined in the definition data; and
updating the definition information by changing a value indicating the position of the process region in the definition information to a value indicating the adjusted position of the process region.

* * * * *